United States Patent
Yadav et al.

(10) Patent No.: US 11,651,557 B2
(45) Date of Patent: May 16, 2023

(54) SYSTEMS AND METHODS OF USING MIXED REALITY FOR INTERACTING WITH A DISPLAY SYSTEM

(71) Applicant: Ford Global Technologies, LLC, Dearborn, MI (US)

(72) Inventors: Girish Yadav, Dearborn, MI (US); Shan Chy Chueh, Ypsilanti, MI (US); Kangning Chen, Detroit, MI (US); Jason Snow, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 17/146,702

(22) Filed: Jan. 12, 2021

(65) Prior Publication Data
US 2022/0222899 A1    Jul. 14, 2022

(51) Int. Cl.
*H04L 65/4038* (2022.01)
*G06T 19/00* (2011.01)
*G06T 17/05* (2011.01)
*G06T 15/06* (2011.01)
*H04L 65/401* (2022.01)
*G06T 19/20* (2011.01)

(52) U.S. Cl.
CPC ............ *G06T 19/003* (2013.01); *G06T 15/06* (2013.01); *G06T 17/05* (2013.01); *G06T 19/20* (2013.01); *H04L 65/4015* (2013.01); *H04L 65/4038* (2013.01)

(58) Field of Classification Search
CPC ....... G06T 19/003; G06T 15/06; G06T 17/05; G06T 19/20; H04L 65/4015
See application file for complete search history.

(56) References Cited

U.S. PATENT DOCUMENTS

| | | | |
|---|---|---|---|
| 8,823,697 B2 | 9/2014 | Woo et al. | |
| 9,418,479 B1 * | 8/2016 | Worley, III | G06F 3/0304 |
| 10,025,375 B2 * | 7/2018 | Lazor | G06T 19/20 |
| 10,482,674 B1 * | 11/2019 | Wu | G09B 25/00 |
| 10,551,280 B2 * | 2/2020 | Poser | G01N 29/043 |
| 10,915,781 B2 * | 2/2021 | Lin | G06T 7/246 |

(Continued)

FOREIGN PATENT DOCUMENTS

KR    101977332 B1    5/2019

OTHER PUBLICATIONS

Kritzler et al, "The Virtual Twin: Controlling Smart Factories using a spatially-correct Augmented Reality Representation", Siemens Corporate Technology, Berkeley, CA., ACM Digital Library ISBN 978-1-4503-5318, Proceedings of the 7th International Conference on the Internet of Things, Oct. 2017, Article 38, 2 pages.

*Primary Examiner* — Said Broome
(74) *Attorney, Agent, or Firm* — Brandon Hicks; Eversheds Sutherland (US) LLP

(57) ABSTRACT

Systems and methods interacting with tabletop models are provided herein. A display system includes a tabletop model, including a horizontal display that is configured to display a two-dimensional digital map and a three-dimensional physical model that is configured to overlay the two-dimensional digital map. The display receives a selection of an object from a device of a display system and synchronizes a change to the tabletop model and the three-dimensional digital model that reflects the selection of the object.

20 Claims, 2 Drawing Sheets

(56) References Cited

U.S. PATENT DOCUMENTS

| | | | | |
|---|---|---|---|---|
| 11,055,919 | B2* | 7/2021 | Nattinger | G06V 20/20 |
| 2015/0243084 | A1* | 8/2015 | Kanemaru | G06V 20/00 |
| | | | | 345/426 |
| 2016/0307374 | A1* | 10/2016 | Kurz | G06F 3/013 |
| 2020/0294316 | A1* | 9/2020 | Ikeda | G06F 3/0426 |

\* cited by examiner

SYSTEMS AND METHODS OF USING MIXED REALITY FOR INTERACTING WITH A DISPLAY SYSTEM

TECHNICAL FIELD

The present disclosure relates to systems and methods for interacting with a display system.

BACKGROUND

Tabletop models, such as a model of a transportation operating system (TOS), allow users to explore features and objects of the model. However, interacting with the tabletop model may be difficult, for example, where objects are out of physical reach of a user. Moreover, it would be beneficial to use the tabletop model to collaborate from a remote location.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
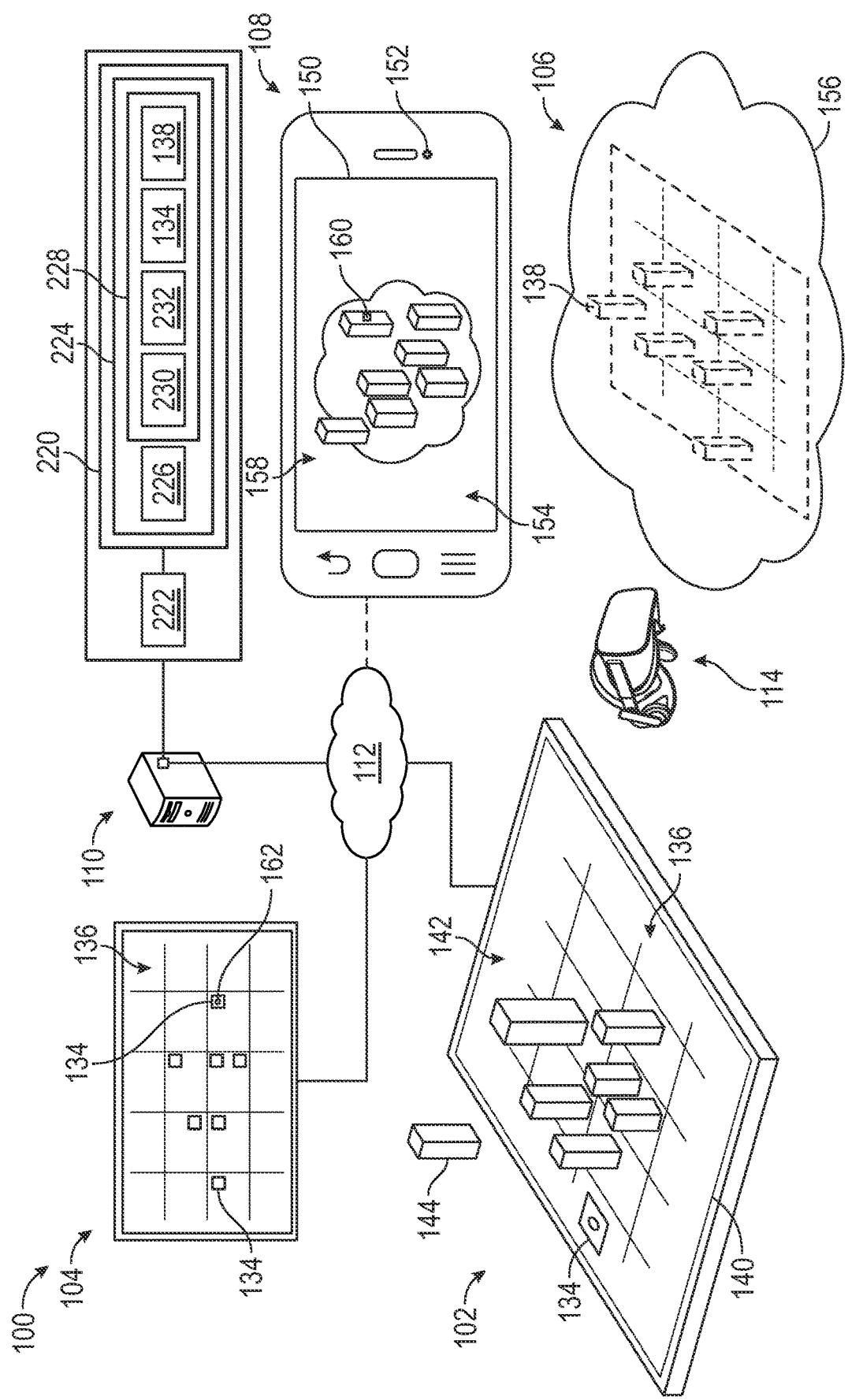
FIG. 1 depicts a display system including a tabletop model and a mobile device in accordance with the disclosure.

Referring to FIG. 1, a display system 100 includes: one or more local viewing and/or interaction systems including a tabletop model 102 and a vertical display 104; one or more devices for viewing and/or interacting with a three-dimensional digital model 106 including a mobile device 108; and one or more computer systems for coordinating the display of information across viewing systems and devices including a system computer 110. The tabletop model 102, vertical display 104, the mobile device 108, and the system computer 110 may communicate with one another over a network 112.

The system computer 110 displays the two-dimensional digital map 136 on a horizontal display 140 (e.g., a tabletop display) of the tabletop model 102 and/or on the vertical display 104. The tabletop model 102 includes the horizontal display 140 and a three-dimensional physical model 142. The three-dimensional physical model 142 overlays the two-dimensional digital map 136 on the horizontal display 140.

The three-dimensional physical model 142 includes three-dimensional physical objects 144. The three-dimensional physical objects 144 are physical models of the three-dimensional digital objects 138. The three-dimensional physical objects 144 align with the two-dimensional digital objects 134 of the horizontal display 140.

The devices for interacting with the three-dimensional digital model 106 may be used at a location that is remote from the location of the tabletop model 102. The mobile device 108 is configured to at least view the three-dimensional digital model 106. In addition, the mobile device 108 and the headset 114 may be configured to select an object via the three-dimensional digital model 106.

The mobile device 108 includes a touchscreen display 150 and a camera 152. The camera 152 is configured to capture a camera image 154 (e.g., image data) of a surface 156 at a remote location and render a model image 158 of the three-dimensional digital model 106. The model image 158 is positioned on the touchscreen display 150 to overlay the camera image 154 and thereby make the three-dimensional digital model 106 appear to be on the surface 156.

The display system 100 is configured to receive a selection of an object from the mobile device 108, from the headset 114, from the tabletop model 102, and/or from the vertical display 104. To select an object with the mobile device 108, the touchscreen display 150 of the mobile device 108 can be touched at a touch point 160 on the model image 158 that corresponds to a three-dimensional digital object 138. To select an object with the vertical display 104 (e.g., a touchscreen display), the vertical display 104 can be touched at a touch point 162 within the area of a two-dimensional digital object 134. To select an object with the headset 114, a gaze or hand tracking feature may be used.

Upon receiving a selection of an object from a remote device (e.g., the mobile device 108) or a local device (e.g., the vertical display 104), the display system 100 is configured to synchronize changes to the three-dimensional digital model 106 and the tabletop model 102 to reflect the selection of the object. For example, the display system 100 highlights a selected object on the tabletop model 102, on the vertical display 104, and on the three-dimensional digital model 106. In addition, the display system 100 may access and display object data 228 on the vertical display 104 and the mobile device 108.

In this manner, the local devices and remote devices are synchronized by the system computer 110, for example, during a session. Users in a remote location can view and interact with the three-dimensional digital model 106 along with users that are viewing and interacting with the tabletop model 102 and vertical display 104. The interactions in one location are seen by the users in the other location.

Illustrative Embodiments

Referring to FIG. 1, the display system 100 includes: one or more local viewing and/or interaction systems including the tabletop model 102 and the vertical display 104; one or more devices for viewing and/or interacting with a three-dimensional digital model 106 including the mobile device 108 and the headset 114; and one or more computer systems for coordinating the display of information across viewing systems and devices including the system computer 110.

Functions disclosed herein can be executed internally by the tabletop model 102, the vertical display 104, and the mobile device 108; and/or can be executed externally by the system computer 110. Generally, the functions of the display system 100 may be centralized or decentralized among the elements of the display system 100.

The tabletop model 102, vertical display 104, the mobile device 108, and the system computer 110 may communicate with one another over the network 112. The network 112 may include any one or a combination of multiple different types of networks, such as cable networks, the Internet, wireless networks, and other private and/or public networks. In some instances, the network 112 may include cellular, Wi-Fi, or Wi-Fi direct.

The system computer 110 includes a memory 220 and a processor 222. The memory 220 stores instructions that are executed by the processor 222 to perform aspects of methods disclosed herein. When referring to operations executed by the system computer 110, it will be understood that this may include the execution of instructions by the processor 222.

Each of the tabletop model 102, vertical display 104, and the mobile device 108 may similarly include a memory and processor for executing instructions of the methods described herein. For purposes of illustration, the methods may be described as being executed by the system computer 110.

The memory 220 includes geospatial data 224. The geospatial data 224 includes feature data such as event data 226 and object data 228. For example, event data 226 may include traffic information, environmental information (e.g., from a weather station), temporal information (e.g., the time period at which the event exists), and the like.

Object data 228 includes data associated with an object such as an object location 230, object attribute information 232, a two-dimensional digital object 134 of a two-dimensional digital map 136, and a three-dimensional digital object 138 of the three-dimensional digital model 106. Objects may include roads, buildings, districts, neighborhoods, bodies of water, parks, vehicles, pedestrians, public transportation systems, and the like. For purposes of illustration, a building is discussed in further detail below as an exemplary object.

The object location 230 may be x, y, z coordinates on a coordinate system of the horizontal display 140. The attribute information 232 (e.g., characteristics of the object) may include descriptions, statistics, graphics, and other information associated with the object.

The two-dimensional digital object 134 may be a footprint, graphical representation, or two-dimensional digital polygon-shaped cross-sectional area. The two-dimensional digital object 134 may define an area of connected streets or the footprint of a building.

The system computer 110 is configured to compile and format the geospatial data 224 to generate an image of the two-dimensional digital map 136 (e.g., a planner representation) of a geographical area. The two-dimensional digital map 136 can display various layers of a city map representing the characteristics and performance of a transportation system, infrastructure, and land use. The two-dimensional digital object 134 of an object is positioned at an associated object location 230 on the two-dimensional digital map 136.

The system computer 110 displays the two-dimensional digital map 136 on the horizontal display 140 (e.g., a tabletop display) of the tabletop model 102 and/or on the vertical display 104. The horizontal display 140 may be a light emitting diode (LED) tabletop display for use in a transportation operating system (TOS) model. For example, the horizontal display 140 may provide a map of city streets or a geographical area.

The horizontal display 140 can be controlled to alter any of a hue, intensity, color, brightness, and/or other similar attribute of the two-dimensional digital object 134. For example, after selection of an object, the system computer 110 may change a pattern, color, brightness, intensity, tint, or hue of the associated two-dimensional digital object 134 to highlight the object.

The tabletop model 102 includes the horizontal display 140 and a three-dimensional physical model 142. The three-dimensional physical model 142 overlays the two-dimensional digital map 136 on the horizontal display 140. The three-dimensional physical model 142 includes three-dimensional physical objects 144. The three-dimensional physical objects 144 are physical models of the three-dimensional digital objects 138.

The three-dimensional physical objects 144 align with the two-dimensional digital objects 134 of the horizontal display 140. The scale of the two-dimensional digital map 136 and the scale of the three-dimensional physical model 142 are selected, and the three-dimensional physical model 142 is positioned on the two-dimensional digital map 136, such that a three-dimensional physical object 144 has the object location 230 of a corresponding two-dimensional digital object 134 (e.g., vertically aligned with one another). The three-dimensional physical object 144 overlays the corresponding two-dimensional digital object 134.

The three-dimensional physical model 142 may be printed or manufactured with a translucent material such as a polymer or glass. When a two-dimensional digital object 134 is highlighted, light from the two-dimensional digital object 134 is transmitted through the aligned three-dimensional physical object 144 to illuminate and highlight the three-dimensional physical object 144.

To select an object with the vertical display 104 (e.g., a touchscreen display), the vertical display 104 can be touched at a touch point 162 within the area of a two-dimensional digital object 134.

Devices for interacting with the three-dimensional digital model 106 may be used at a location that is remote from the location of the tabletop model 102. The mobile device 108 is configured to view and interact with the three-dimensional digital model 106 and thereby virtually view and virtually interact with the tabletop model 102.

The mobile device 108 includes a touchscreen display 150 and a camera 152. The camera 152 is configured to capture a camera image 154 (e.g., image data) of a surface 156 at a remote location and render a model image 158 of the three-dimensional digital model 106. The model image 158 is positioned on the touchscreen display 150 to overlay the camera image 154 of the surface 156 and thereby make the three-dimensional digital model 106 appear to be on the surface 156.

The three-dimensional digital model 106 may be a three-dimensional digital representation of the three-dimensional physical model 142. For example, the three-dimensional digital model 106 is generated from a scan of the three-dimensional physical model 142 or is a computer assisted design (CAD) model of a city or geographical area.

The three-dimensional digital model 106 includes three-dimensional digital objects 138. Each may include at least the basic dimensions of an object (e.g., a rectangular prism may model a building). However, more complicated three-dimensional models can also be used. The three-dimensional digital objects 138 may be three-dimensional digital representations of the three-dimensional physical objects 144.

The position, scale, and rotation of the three-dimensional digital model 106 may be determined according to a given location and orientation of a theoretical or virtual camera. The mobile device 108 can render a model image 158 of the three-dimensional digital model 106 at a scale, position, and perspective to overlay the camera image 154 by aligning the pose of the virtual camera and the pose of the camera 152.

A marker may be used to determine the scale, position, and perspective of the three-dimensional digital model 106. For example, the mobile device 108 may be trained beforehand on a marker (e.g., an image with known geometry) so that, when the marker is recognized in the camera image 154, the position, scale, and rotation of the marker can be determined from the known geometry. The three-dimensional digital model 106 can then be positioned, scaled, and rotated to render the model image 158 based on the position, scale, and rotation of the marker.

Additionally or alternatively, the mobile device 108 may process the camera image 154 to determine interest points (e.g., on the surface 156 at different camera poses) or optical flow. The interest points or features may be determined using image processing methods such as corner detection or edge detection. The feature points may be combined with sensor information from an inertial measurement system of the mobile device 108 to position, scale, and rotate the three-dimensional digital model 106.

An inertial measurement unit (IMU) may include one or more sensors that measure force, angular rate, orientation, direction and the like. The sensors may include, for example, an accelerometer, a gyroscope, and a magnetometer.

Simultaneous localization and mapping (SLAM) methods can be used for relative positions of feature points. Motion methods may be used for optical flow.

The mobile device 108 overlays the model image 158 of the three-dimensional digital model 106 over the camera image 154 of the surface 156 obtained from the camera 152, making it appear on the touchscreen 172 as if the three-dimensional digital model 106 is on the surface 156.

The model image 158 can be made at least partially transparent or translucent such that the camera image 154 of the surface 156 is at least partially visible through at least parts of the model image 158. At least some portions of the model image 158 may have a brightness, intensity, color, tint, or hue (e.g., portions of the model image 158 that correspond to three-dimensional digital objects 138 or other features that have been selected or that can be selected to provide additional information)

Once the model image 158 of the three-dimensional digital model 106 is positioned to overlay the camera image 154 of the surface 156 obtained from the camera 152, the mobile device 108 can be used to select an object of the three-dimensional digital model 106. To select an object, the touchscreen display 150 of the mobile device can be touched at a touch point 160 on the model image 158 that corresponds to a three-dimensional digital object 138.

Figure 2:
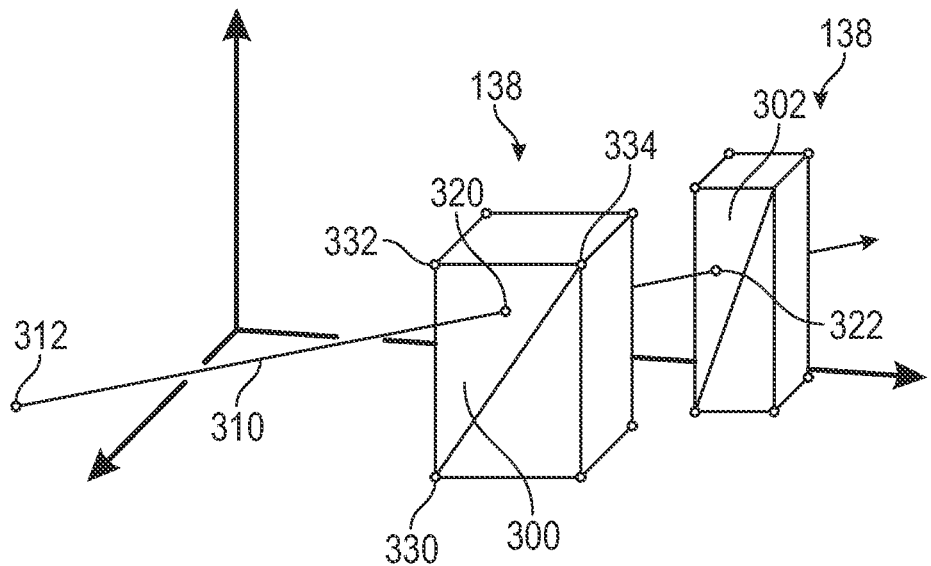
FIG. 2 depicts an intersection of a ray with an object of a three-dimensional digital model in accordance with the present disclosure.

The three-dimensional digital model 106 includes polygons (e.g., a polygon mesh). One or more polygons define the surfaces of a three-dimensional digital object 138 and are associated with the object. For example, referring to FIG. 2, three-dimensional digital objects 138 are defined by triangles 300, 302.

A ray 310 is defined by the touch point 160 and the orientation of the camera 152. The touch point 160 defines an origin point 312 of the ray 310. The direction of the ray 310 is based on the orientation of the camera 152.

The mobile device 108 identifies intersection points 320, 322 between the ray 310 and the triangles 300, 302 of the three-dimensional digital model 106, for example, using ray-polygonal model intersection methods.

As an example, the triangle 300 has three vertices 330, 332, 334. To get the intersection point 320 of ray 310 with the triangle 300, the mobile device 108 first determines the intersection point 320 of ray 310 with a plane in which the triangle 200 lies.

An intersection point 320 may be mathematically defined as p=O+td, where p is the intersection point 320, O is the origin point 312 of the ray 310, t is the distance from the origin point 312 to the intersection point 320, and d is the direction of the ray 310. Here, the point p may be determined by solving for the distance t where the intersection between the ray 310 and the plane of the triangle 300 occurs.

Once the intersection point 320 for the plane is determined, the mobile device 108 determines if the intersection point 320 is in the triangle 300. For example, the parametric plane equation may be used.

If the vertices 330, 332, 334 are labeled a, b, and c, any point p on the plane can be given by $a+\beta(b-a)+\gamma(c-a)$, where $\beta$ is a multiplier of the vector from point a to point b and $\gamma$ is a multiplier of the vector from point a to point c. The point p is in the triangle 300 if there is a solution to $p=a+\beta(b-a)+\gamma(c-a)$ where $0 \leq \beta$, $0 \leq \gamma$, and $\beta+\gamma \leq 1$.

The intersection point 320 and the multipliers that determine whether the intersection point 320 is in the triangle 300 can also be solved simultaneously using a set of three linear equations in matrix form.

If there is more than one triangle 300, 302 with an intersection point 320, 322, the triangle 300 with the intersection point 320 that is nearest to the origin point 312 of the ray 310 (e.g., the smallest distance t) is selected. The three-dimensional digital object 138 that includes the selected triangle 300 is the selected three-dimensional digital object 138.

Figure 3:
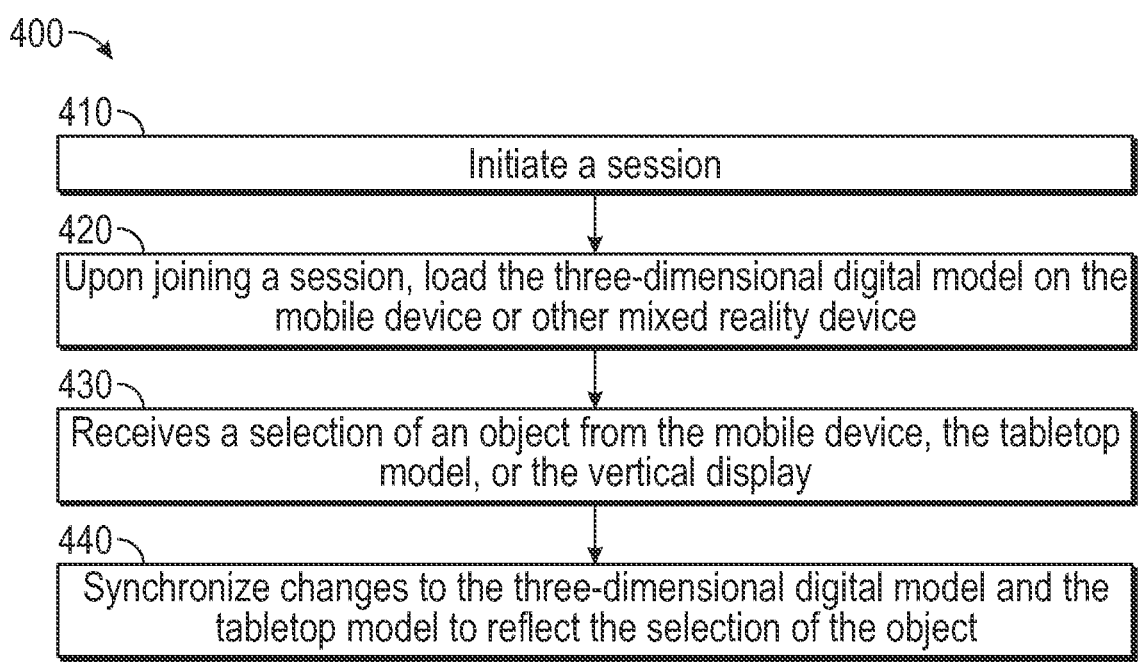
FIG. 3 depicts a method of collaborating using the tabletop model in accordance with the present disclosure.

The display system 100 is configured to receive a selection of an object from the mobile device 108, the tabletop model 102, and/or the vertical display 104. Referring to FIG. 3, an exemplary method 400 performed by the display system 100 is described.

According to a first step 410, a user initiates a session. For example, a session may be initiated via the tabletop model 102 or the vertical display 104.

According to a second step 420, the system computer 110 generates a session identifier and sends the session identifier to users who may join on the vertical display 104 or on a remote device such as the mobile device 108 (or another mixed reality device such as a headset). Users may be authenticated, for example, with a username and password to join the session. Upon joining a session, the three-dimensional digital model 106 is loaded on the mobile device 108 or other mixed reality device.

According to a third step 430, the system computer 110 receives a selection of an object from a remote device (e.g., the mobile device 108) or a local device (e.g., the vertical display 104).

According to a fourth step 440, the system computer 110 is configured to synchronize changes to the three-dimensional digital model 106 and the tabletop model 102 to reflect the selection of the object. For example, the display system 100 highlights a selected object on the tabletop model 102, on the vertical display 104, and on the three-dimensional digital model 106.

To highlight an object on the three-dimensional digital model 106, the associated three-dimensional digital object 138 are highlighted with a brightness, intensity, color, tint, hue, and/or other visual attribute. Similarly, to highlight an object on the tabletop model 102 and the vertical display 104, the associated two-dimensional digital object 134 is highlighted with a brightness, intensity, color, tint, hue, and/or other visual attribute. For the tabletop model 102, as the three-dimensional physical model 142 may be printed or manufactured with a translucent material such as a polymer or glass, when a two-dimensional digital object 134 is highlighted, light from the two-dimensional digital object 134 is transmitted through the aligned three-dimensional physical object 144 to illuminate and highlight the three-dimensional physical object 144.

In addition, the display system 100 may access and display object data 228 on the vertical display 104 and the mobile device 108.

According to the method 400, the local devices and remote devices are synchronized by the system computer 110, for example, during a session. Users in a remote location can view and interact with the three-dimensional digital model along with users that are viewing and interacting with the tabletop model 102 and vertical display 104. The interactions in one location are seen by the users in the other location.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more Application Specific Integrated Circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A display system, comprising:
a tabletop model, comprising:
a horizontal display that is configured to display a first two-dimensional digital map; and
a three-dimensional physical model that is configured to overlay the first two-dimensional digital map; and
a mobile device comprising a camera, wherein the mobile device is configured to generate a camera image and overlay the camera image with a model image of a three-dimensional digital model,
wherein, the display system is configured to:
receive a first selection of an object from a device of the display system; and
synchronize a first change to the tabletop model and a second change to the three-dimensional digital model, wherein the first change and the second change reflect the first selection of the object, wherein the three-dimensional digital model is trained using at least one of a marker and one or more feature points to determine a position, a scale, and a rotation of the three-dimensional digital model, wherein the marker comprises a training image, with a known geometry, generated by the mobile device, and wherein the one or more feature points are determined by applying image processing, comprising corner detection or edge detection, to the camera image.

2. The display system of claim 1, wherein the first two-dimensional digital map comprises a two-dimensional digital object.

3. The display system of claim 2, wherein the first change to the tabletop model comprises a third change to the two-dimensional digital object.

4. The display system of claim 2, wherein the object is a building and the two-dimensional digital object is a footprint of the building.

5. The display system of claim 2, wherein the three-dimensional physical model comprises a three-dimensional physical object, and wherein the three-dimensional physical object is generated based at least in part on the one or more feature points via simultaneous localization and mapping methods.

6. The display system of claim 5, wherein the three-dimensional physical object is aligned with the two-dimensional digital object.

7. The display system of claim 6, wherein the three-dimensional physical model is transparent or translucent.

8. The display system of claim 1, wherein the three-dimensional digital model is a digital representation of the three-dimensional physical model.

9. The display system of claim 1, wherein the three-dimensional digital model comprises a three-dimensional digital object.

10. The display system of claim 9, wherein the three-dimensional digital object comprises one or more polygons, wherein a touch position and an orientation of the camera defines a ray, wherein the first selection of the object by the mobile device comprises determining an intersection point of the ray with one of the one or more polygons, and wherein a determination of whether the intersection point is within the one of the one or more polygons is based at least in part on a parametric plane equation.

11. The display system of claim 9, wherein receiving the first selection of the object from the device of the display system comprises receiving a second selection of the three-dimensional digital object from the mobile device.

12. The display system of claim 9, wherein the second change to the three-dimensional digital model comprises a fourth change to the three-dimensional digital object.

13. The display system of claim 1, further comprising a vertical display that is configured to display a second two-dimensional digital map that comprises a two-dimensional digital object, wherein the first selection of the object comprises a third selection of the two-dimensional digital object.

14. The display system of claim 1, wherein at least one of the first change and the second change comprises at least one of a change in brightness, intensity, color, tint, or hue.

15. The display system of claim 1, wherein the three-dimensional digital model is loaded to the mobile device after a session is initiated and a user associated with the mobile device is authenticated.

16. A method, comprising:
receiving a first selection of an object from a device of a display system; and
synchronizing a first change to a tabletop model and a second change to a three-dimensional digital model, wherein the first change and the second change reflect the first selection of the object,
wherein the tabletop model comprises:

a horizontal display that is configured to display a two-dimensional digital map, wherein the two-dimensional digital map comprises a two-dimensional digital object; and a three-dimensional physical model that is configured to overlay the two-dimensional digital map, wherein the three-dimensional physical model comprises a three-dimensional physical object, wherein the three-dimensional physical object overlays the two-dimensional digital object, and wherein the three-dimensional physical model is transparent or translucent, and wherein the three-dimensional digital model is loaded on a mobile device comprising a camera, wherein the mobile device is configured to generate a camera image and overlay the camera image with a model image of the three-dimensional digital model, wherein the three-dimensional digital model is a digital representation of the three-dimensional physical model, wherein the three-dimensional digital model comprises a three-dimensional digital object, wherein the three-dimensional digital model is trained using at least one of a marker and one or more feature points to determine a position, a scale, and a rotation of the three-dimensional digital model, wherein the marker comprises a training image, with a known geometry, generated by the mobile device, and wherein the one or more feature points are determined by applying image processing, comprising corner detection or edge detection, to the camera image.

17. The method of claim 16, wherein the first change to the tabletop model comprises a third change to the two-dimensional digital object and the second change to the three-dimensional digital model comprises a fourth change to the three-dimensional digital object, and wherein the three-dimensional physical object is generated based at least in part on the one or more feature points via simultaneous localization and mapping methods.

18. The method of claim 16, wherein receiving the first selection of the object from the device of the display system comprises receiving a second selection of the three-dimensional digital object from the mobile device.

19. The method of claim 16, wherein at least one of the first change and the second change comprises at least one of a change in brightness, intensity, color, tint, or hue.

20. The method of claim 16, further comprising loading, in response to joining a session and authenticating a user associated with the mobile device, the three-dimensional digital model onto the mobile device.

* * * * *